United States Patent [19]
Hartenstein et al.

[11] 3,907,773
[45] Sept. 23, 1975

[54] NOVEL $\Delta^4\Delta^5$-DEHYDROCARDENOLIDES AND PROCESS FOR THEIR PREPARATION

[75] Inventors: Johannes Hartenstein, Wittental; Gerhard Satzinger, Im Mattenbuhl; Manfred Herrmann, Gundelfingen, all of Germany

[73] Assignee: Warner-Lambert Company, Morris Plains, N.J.

[22] Filed: June 5, 1973

[21] Appl. No.: 367,258

[30] Foreign Application Priority Data
June 5, 1972 Germany............................ 2227223

[52] U.S. Cl.............................. 260/210.5; 424/182
[51] Int. Cl.²......................................... C07J 19/00
[58] Field of Search................... 260/210.5, 239.57

[56] References Cited
UNITED STATES PATENTS

| | | | |
|---|---|---|---|
| 3,177,200 | 4/1965 | Meyer............................ | 260/239.57 |
| 3,223,587 | 12/1965 | Wilkinson....................... | 260/210.5 |
| 3,462,528 | 8/1969 | Voigtlander et al............. | 260/210.5 |
| 3,471,470 | 10/1969 | Heider et al.................... | 260/210.5 |
| 3,726,857 | 4/1973 | Leimen........................... | 260/210.5 |
| 3,732,203 | 5/1973 | Stache et al.................... | 260/210.5 |

Primary Examiner—Johnnie R. Brown
Assistant Examiner—Cary B. Owens
Attorney, Agent, or Firm—Albert H. Graddis; Frank S. Chow

[57] ABSTRACT

U.S. Pat. application Ser. No. 306,640, filed Nov. 11, 1972, and now U.S. Pat. No. 3,850,906 relates to new $\Delta^4/\Delta^5$-dehydrocardenolides of the general formula I:

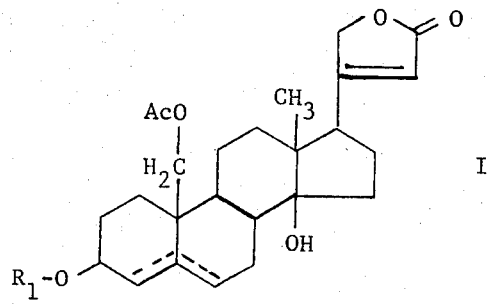

wherein $R_1$ represents a tetrahydropyranosyl or glycosyl residue, both substituted, if necessary, Ac represents the acetyl residue and the broken line denotes a double bond between either C-atoms 4 and 5 or 5 and 6.

24 Claims, No Drawings

NOVEL DELTA 4/DELTA 5-DEHYDROCARDENOLIDES AND PROCESS FOR THEIR PREPARATION

U.S. Pat. application Ser. No. 306,640 and now U.S. Pat. No. 3,850,906 relates to a process for the preparation of compounds according to formula I, characterized by the reaction of compounds of general formula II:

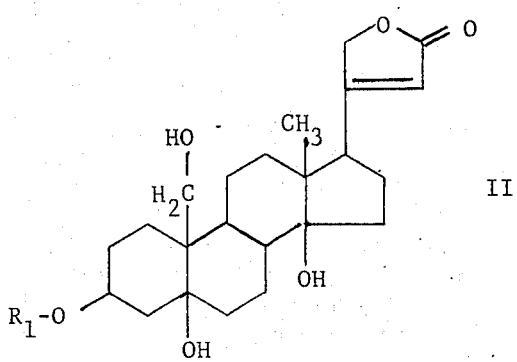

wherein $R_1$ is as defined above with an equivalent amount or excess amounts of a trialkyl orthoacetate in the presence of an acid catalyst in, if necessary, an inert organic solvent and, if desired and possible, by the subsequent ketalization and/or alkylation and/or acylation of suitable functional groups of the residue $R_1$ or, if possible, by the subsequent saponification of acetate groups of the residue $R_1$.

It has now been found as an additional embodiment of the primary patent application Ser. No. 306,640, and now U.S. Pat. No. 3,850,906 that the process can be expanded to include the reaction of compounds of formula II with substituted trialkyl orthoacetates as well as with substituted and unsubstituted higher orthocarboxylic acid trialkyl esters, and also, that the so obtained $\Delta^4$ / $\Delta^5$-dehydrocardenolides exhibit a higher oral effectiveness than the corresponding 5,19-dihydroxycardenolides.

The present invention relates to compounds of the general formula I, wherein $R_1$ is as defined above and Ac represents an acetyl residue substituted by a halogen, methoxy, ethoxy, propoxy, cyano or carboalkoxy group, or the acyl residue of an organic carboxylic acid with 3 to 5 carbon atoms, the acyl residue of which, if necessary, is substituted by halogen, methoxy, ethoxy or acetoxy.

The present invention also relates to a process for the preparation of the aforementioned compounds which is characterized by the reaction of compounds of formula II, wherein $R_1$ is as defined above with an equivalent amount or excess amounts of a lower trialkyl orthoester of a carboxylic acid in the presence of an acid catalyst in, if necessary, an inert organic solvent and, if desired and possible, by the subsequent ketalization and/or alkylation and/or acylation of suitable hydroxyl groups or by the subsequent saponification of acetate groups of the residue $R_1$.

The process conditions for the preparation of the compounds of the present invention correspond to those of the primary patent application U.S. Ser. No. 306,604 and now U.S. Pat. No. 3,850,906.

Suitable as trialkyl orthocarboxylic acid esters are lower alkylorthoester derivatives of, e.g., the following carboxylic acids: methoxyacetic acid, ethoxyacetic acid, propoxyacetic acid, chloroacetic acid, cyanoacetic acid, carboethoxyacetic acid, propionic acid, acetoxylactic acid, methoxypropionic acid, ethoxypropionic acid, chloropropionic acid, butyric acid, isobutyric acid, 2-methylbutyric acid, valeric acid and isovaleric acid.

The cardenolides described in the primary application U.S. Ser. No. 306,604 are useful as starting compounds of general formula II. Suitable are, e.g., cymarol, acetylcymarol, propionylcymarol, diacetylhelveticosol 4'-O-methylhelveticosol, 4'-O-ethylhelveticosol, isopropylidenehelveticosol, sec-butylidenehelveticosol, cyclopentylidenehelveticosol, cyclohexylidenehelveticosol, triacetylconvallatoxol, isopropylideneconvallatoxol, sec-butylideneconvallatoxol, cyclopentylideneconvallatoxol, cyclohexylideneconvallatoxol, 4'-O-methylisopropylideneconvallatoxol, 4'-O-ethylisopropylideneconvallatoxol, 4'-O-acetylisopropylideneconvallatoxol and 4'-O-propionylisopropylideneconvallatoxol.

Like the certain products of the original patent application U.S. Ser. No. 306,640 and now U.S. Pat. No. 3,850,906, the primary products of the present invention are obtained as the mixtures of $\Delta^4$ and $\Delta^5$-dehydrocardenolides, in which the $\Delta^4$-isomer predominates. The products may be used as such or be separated into their components by chromatography and/or fractional crystallization.

As in the process described in U.S. Pat. application Ser. No. 306,640 and now U.S. Pat. No. 3,850,906, acetoxy groups if present in the residue $R_1$ of compounds of general formula I of the present invention, may be saponified by treatment with either potassium bicarbonate in aqueous methanol or with ammonia in alcohol.

On the other hand, the products obtained according to the process of the present invention can be, if so desired, subsequently ketalized and/or alkylated and/or acylated by known methods if the residue $R_1$ has suitable hydroxyl groups.

Like the products obtained according to the process of U.S. Pat. application Ser. No. 306,640 and now U.S. Pat. No. 3,850,906, according to the process of the present invention possess valuable pharmacological properties and are likewise important as intermediate products for the preparation of biologically active steroids. In particular, the compounds of the present invention exhibit a positive-inotropic effect on the heart muscles of various mammals and show a higher oral effectiveness than the corresponding 5,19-dihydroxycardenolides and are thus suited for treatment of cardiac insufficiency.

PHARMACOLOGICAL RESULTS

The claimed compounds possess high oral effectiveness as compared to the reference compounds.

To illustrate the advantages of the claimed compounds, the following was performed.

The problem of appropriate reference compounds to determine whether the claimed compounds are to be considered orally effective on the basis of the techniques with recognized cardio active steroidal compounds remains. It must be explicitly realized that glycosides of the strophanthidin type, with which we are concerned here, represent one specific type of effective cardiac glycoside. A comparison with the known orally effective digitalis glycosides is not permissable, since, in spite of some significant qualitative similarities, important therapeutic differences exist. These facts induced, for example, G. Baumgarten (in "Die Herzwirksamen Glykoside", Leipzig, 1963 S. 284) to state: "Without question, a well absorbed and thereby orally reliable stropthanthidin or convallatoxin preparation would be an accomplishment." The desire of clinicians to have in hand an "orally effective strophanthidin" was fully substantiated by Sundermann and Fiehring (Dtsch. Ges. Wesen 22 (1967), 919).

Consequently, the question regarding the oral effectiveness of the products of this invention in comparison to those of the reference cardenolides must be settled; in the present case also that of convallatoxin, cymarol and helveticoside.

Convallatoxin, like convallatoxol and strophanthin, is practically not absorbed and is inactive on oral administration (compare, G. Baumgarten et al, Dtsch. Ges. Wesen 25 (1970), 922, column 2, section 7). In the existing commercial convallatoxin preparations, the problem is associated with the drug extracts, which, although standardized, are effected by known deficiencies of such galenic preparations. In comparison to strophanthin, cymarin or cymarol are indeed orally active. The absorption rate, however, leaves much to be desired, since relatively high doses are needed for the attainment and maintenance of full effectiveness (compare, Fiehring, Dtsch. Ges. Wesen 25, 287 (1970); Belz, Die Herzwirksamen Glykoside, Munchen, 1971, S. 61).

As already mentioned, in the present case it remains only therefore to determine the oral effectiveness of the glycosides of this invention in comparison to the respective parent substance.

The following experiments were performed.

Anesthetized cats, while kept under standard conditions, were laparatomized and after pylorus ligation, canula were attached to the duodenum. While the test substance was infused into the right V jugular vein in one animal, the infusion occurred in the duodenum of another animal. According to the required criterion, both animals were titrated exactly to the same endpoint, that is, until death occurred. The relative oral effectiveness (re W) can be calculated from the quantity of the infusion solution consummed by the i.v. and i.d. applications.

In this way the following results were obtained:

| Substance | | $LD_{100}$ i.v. mg/kg | Cymarols $LD_{100}$ i.d. mg/kg | Relative Oral Effectiveness $reW = \dfrac{LD_{100} \text{i.v.} \times 100}{LD_{100} \text{i.d.}}$ |
|---|---|---|---|---|
| Example | 17 | 1.850 | 1.550 | > 100 |
| " | 1 | 1.064 | 1.330 | 80 |
| " | 16 | 1.604 | 2.090 | 77 |
| " | 2 | 0.645 | 1.439 | 45 |
| " | 5 | 1.232 | 3.304 | 37 |
| " | 15 | 0.579 | 2.281 | 25 |
| Cymarol | | 0.180 | 1.274 | 14 |
| | | | Convallatoxols | |
| Example | 9 | 2.800 | 1.781 | >100 |
| " | 13 | 2.974 | 2.422 | >100 |
| " | 12 | 1.753 | 1.235 | >100 |
| " | 23 | 2.490 | 2.170 | >100 |
| " | 10 | 0.961 | 1.776 | 54 |
| " | 11 | 0.790 | 3.348 | 24 |
| Convallatoxin | | 0.095 | φ | according to literature <10 |
| | | | Helveticosols | |
| Example | 6 | 2.863 | 3.568 | 80 |
| " | 21 | 2.927 | 3.001 | 99 |
| " | 22 | 2.068 | 2.650 | 69 |
| " | 18 | 1.135 | 2.224 | 51 |
| " | 4 | 2.950 | 6.036 | 49 |
| " | 19 | 1.418 | 3.153 | 45 |
| Helveticoside | | 0.140 | φ | φ |
| | | | Digoxins | |
| Digoxin | | 0.310 | 0.810 | 38 |
| β-Methyldigoxin | | 0.420 | 0.600 | 70 |

The data show that, in oral effectiveness, the compounds of the present invention differ considerably from the reference compounds and that they even partially surpass that of the uncomparable type of cardiac glycoside, digoxin and β-methyldigoxin, under the suggested experimental conditions. Therefore, they represent potentially useful drugs. Particularly, through the present invention, glycosides of the strophanthin type having unexpected oral efficacy are made available to the physician. Hence the technical progress stands above doubt.

REFERENCES

1. K. Greef and E. Heeg, Arch. Internat. Pharmacodyn., 149, 136–152 (1964)
2. R. A. Hatcher and J. Brody, Amer. J. Pharmacy, 82, 36 (1910)

The following examples serve to illustrate the method of preparation of the compounds of the present invention.

EXAMPLE 1

$\Delta^4/\Delta^5$-Anhydro-cymarol-19-O-propionate 1 ml of triethyl orthopropionate and 25 mg of p-toluenesulfonic acid monohydrate are added to a solution of 275 mg of cymarol in 9 ml of dioxane. The mixture is allowed to stand at room temperature for 60 minutes, mixed with 10 ml of 5% aqueous $NaHCO_3$ solution and exhaustively extracted with chloroform. After drying ($Na_2SO_4$) and evaporation under reduced pressure, the residue is chromatographed on silica gel. Elution with chloroform yields 310 mg of TLC-homogeneous product which can be crystallized from methylene chloride/isopropyl ether. M.p. 173°–175°C $\lambda_{max}$(MeOH) 215 nm (14800), IR (KBr) inter alia 1768/1738, 1630, 1190, 1085 $cm^{-1}$.

Analysis for $C_{33}H_{48}O_9$. Calc.: C — 67.33, H — 8.21, O — 24.46. Found: C — 67.26 H — 8.38 O — 24.50.

EXAMPLE 2

$\Delta^4/\Delta^5$-Anhydro-cymarol-19-O-methoxyacetate

Reacting 1 ml of trimethyl orthomethoxyacetate and 20 mg of p-toluenesulfonic acid monohydrate with 275 mg of cymarol in 9 ml of dioxane and processing the reaction mixture as in Example 1 yield 290 mg of colorless foam which is precipitated from benzene/hexane. M.p. 100°–101°C.

$\Lambda_{max}$(MeOH) 210 nm (16000), IR (KBr) inter alia 1775/1738, 1620, 1085 cm$^{-1}$.

Analysis for $C_{33}H_{48}O_{10}$. Calc.: C — 65.55; H — 8.00; O — 26.46. Found: C — 65.34; H — 7.78; O — 26.85.

EXAMPLE 3

4'-O-Methoxyacetyl-$\Delta^4/\Delta^5$-anhydro-cymarol-19-O-propionate 320 mg of anhydro-cymarol-19-O-propionate are dissolved in 3 ml of pyridine and mixed with 0.1 ml of methoxyacetyl chloride at 0°C. The mixture is allowed to stand at 0°C for 60 minutes, poured into ice water and extracted with chloroform. The combined extracts are washed first with 5% aqueous NaHCO$_3$ solution and then with water. After drying and evaporation the residue obtained is chromatographed on aluminum oxide. Reprecipitation from benzene/hexane yields 255 mg of amorphous, TLC-homogeneous powder. M.p. 68°–71°C.

IR (KBr) inter alia 1775/1738, 1622, 1198, 1095 cm$^{-1}$.

Analysis for $C_{36}H_{52}O_{11}$. Calc.: C — 65.44; H — 7.93; O — 26.64. Found: C — 65.36; H — 7.98; O — 26.58.

EXAMPLE 4

4'-O-Methyl-$\Delta^4/\Delta^5$-anhydro-helveticosol-19-)-propionate 1 ml of triethyl orthopropionate and 30 mg of p-toluenesulfonic acid monohydrate are added to a solution of 503 mg of 4'-O-methyl-helveticosol in 9 ml of dioxane and the mixture is allowed to react at room temperature for 45 minutes. Processing as in Example 1 yields 290 mg of TLC-homogeneous product which is precipitated from methylene chloride with isopropyl ether. M.p. 98°–103°C.

IR (KBr) inter alia 1780/1738, 1625, 1190, 1098 cm$^{-1}$.

Analysis for $C_{33}H_{48}O_9$. Calc.: C — 67.33; H — 8.21; O — 24.46. Found: C — 67.20; H — 8.11; O — 24.83.

EXAMPLE 5

$\Delta^4/\Delta^5$-Anhydro-cymarol-19-O-butyrate

By analolgy to Example 1, 550 mg of cymarol are reacted with trimethyl orthobutyrate. After suitable processing, 500 mg of TLC-homogeneous product are obtained as white foam. M.p. 70°–90°C.

IR (KBr) inter alia 1778/1735, 1620, 1190, 1088 cm$^{-1}$.

Analysis for $C_{34}H_{50}O_9 \cdot 1/2 H_2O$. Calc.: C — 66.75; H — 8.40; O — 24.85. Found: C — 66.52; H — 8.37; O — 25.11.

EXAMPLE 6

3',4'-O-Cyclohexylidene-$\Delta^4/\Delta^5$-anhydro-helveticosol-19-)-methoxyacetate 300 mg of 3',4'-O-cyclohexylidene-helveticosol in 9 ml of dioxane are mixed with 0.6 ml of trimethyl orthomethoxyacetate and 30 mg of p-toluenesulfonic acid monohydrate with stirring. The reaction mixture is stirred at room temperature for 30 minutes, neutralized with 5% aqueous NaHCO$_3$ solution and exhaustively extracted with chloroform. After drying and evaporation under reduced pressure the residue is chromatographed on silica gel. Elution with chloroform-methanol (99.5 : 0.5, v/v) yields 252 mg of product as white foam which crystallizes from chloroform/ether. M.p. 90°–100°C.

$\Lambda_{max}$(MeOH) inter alia 1775/1738, 1620, 1190, 1123 cm$^{-1}$.

Analysis for $C_{38}H_{54}O_{10}$. Calc.: C — 68.03; H — 8.11; O — 23.85. Found: C — 68.30; H — 7.86; O — 23.86.

EXAMPLE 7

3',4'-O-Cyclohexylidene-$\Delta^4/\Delta^5$-anhydro-helveticosol-19-O propionate 300 mg of 3',4'-O-cyclohexylidene-helveticosol in 9 ml of dioxane are reacted with 1 ml of triethyl orthopropionate and 30 mg of p-toluenesulfonic acid monohydrate as in the previous example. Usual work-up and chromatography on silica gel yields 320 mg of product which is precipitated from ether/hexane. M.p. 90°–95°C.

IR (KBr) inter alia 1778/1743, 1620, 1185, 1090 cm$^{-1}$.

Analysis for $C_{38}H_{54}O_9$. Calc.: C — 69.69; H — 8.31; O — 21.98. Found: C — 69.51; H — 8.17; O — 22.25.

EXAMPLE 8

$\Delta^4/\Delta^5$-Anhydro-helveticosol-19-O-methoxyacetate

A mixture of 500 mg of 3',4'-O-diacetyl-helveticosol, 1 ml of trimethyl orthomethoxyacetate and 50 mg of p-toluenesulfonic acid monohydrate in 10 ml of dioxane is reacted and processed as in the previous examples. 452 mg of 3',4'-O-diacetyl-$\Delta^4/\Delta^5$-anhydro-helveticosol-19-O-methoxyacetate are obtained as colorless foam which is dissolved in 10 ml of methanol and mixed with 5 ml of saturated methanolic ammonia solution. The mixture is allowed to stand at room temperature for 18 hours, is evaporated to dryness under reduced pressure, and the residue is chromatographed on silica gel. Elution with chloroform/methanol (95 : 5, v/v) yields 317 mg of product as colorless foam which crystallizes from chloroform/methanol/ether. M.p. 118°–126°C.

$\Lambda_{max}$(MeOH) 215 nm (16700)

IR (KBr) inter alia 1775/1730, 1620, 1182, 1070 cm$^{-1}$.

Analysis for $C_{32}H_{46}O_{10} \cdot 1 H_2O$. Calc.: C — 63.13; H — 7.95; O — 28.92. Found: C — 63.26; H — 7.74; O — 28.85.

EXAMPLE 9

2',3'-O-Isopropylidene$\Delta^4/\Delta^5$-anhydro-convallatoxol-19-O-propionate

Two ml of triethyl orthopropionate and 50 mg of p-toluenesulfonic acid monohydrate are added to a solution of 629 mg of 2',3'-O-isopropylidene-convallatoxol in 18 ml of dioxane. The mixture is allowed to stand at room temperature for 90 minutes and is then processed as described in Example 1. After chromatography on silica gel and crystallization from ether 387 mg of colorless crystalline product are obtained. M.p. 183°–184°C.

$\Lambda_{max}$(MeOH) 215 nm (16700)

IR (KBr) inter alia 1775/1738, 1620, 1381, 1370, 1190, 1123 cm$^{-1}$.

Analysis for $C_{35}H_{50}O_{10}$. Calc.: C — 66.64; H — 7.99; O — 25.37. Found: C — 66.83; H — 8.00; O — 25.24.

EXAMPLE 10

2',3'-Isopropylidene$\Delta^4/\Delta^5$-anhydro-convallatoxol-19-O-methoxyacetate By analogy to Example 9, 608 mg of 2',3'-isopropylidene-convallatoxol are reacted with 1 ml of trimethyl orthomethoxyacetate. 478 mg of product are obtained after usual work-up and crystallization from ether. M.p. 193°–195°C.

$\Lambda_{max}$(MeOH) 217 nm (13700)
IR (KBr) inter alia 1778/1738, 1630, 1381, 1372, 1190, 1075 cm$^{-1}$.

Analysis for $C_{35}H_{50}O_{11}$. Calc.: C — 65.00; H — 7.79; O — 27.21. Found: C — 64.85; H — 7.87; O — 27.34.

EXAMPLE 11

$\Delta^4/\Delta^5$-Anhydro-convallatoxol-19-O-methoxyacetate 1.51 g of 2',3',4'-O-triacetylconvallatoxol in 18 ml of dioxane are mixed with 5 ml of trimethyl orthomethoxyacetate and 110 mg of p-toluenesulfonic acid monohydrate. The mixture is allowed to stand at room temperature for 90 minutes and is then processed as described in Example 1. After chromatography on silica gel 910 mg of product are obtained which, by analogy to Example 8, in 20 ml of methanol is mixed with 10 ml of saturated methanolic ammonia solution. After standing at room temperature for 18 hours the solution is evaporated under reduced pressure, and the product is purified by chromatography. 660 mg of TLC-homogeneous product are obtained which after precipitation from methanol with ether/hexane yields a white, amorphous powder. M.p. 119°–122°C.
IR (KBr) inter alia 1772/1730, 1615, 1190, 1045 cm$^{-1}$.

Analysis for $C_{32}H_{46}O_{11} \cdot 1/2 H_2O$. Calc.: C — 62.43; H — 7.69; O — 29.88. Found: C — 62.49; H — 7.60; O — 29.82.

EXAMPLE 12

2',3'-O-Isopropylidene$\Delta^4/\Delta^5$-anhydro-convallatorol-19-O-butyrate

By analogy to Example 9, 593 mg of 2',3'-O-isopropylidene-convallatoxol are reacted with 2 ml of trimethyl orthobutyrate. 288 mg of TLC-homogeneous product are crystallized from ether. M.p. 219°–223°C.
IR (KBr) inter alia 1775/1738, 1625, 1381, 1371, 1190, 1075 cm$^{-1}$.

Analysis for $C_{36}H_{52}O_{10}$. Calc.: C — 67.05; H — 8.13; O — 24.82. Found: C — 67.07; H — 7.75; O — 24.66.

EXAMPLE 13

2',3'-O-Cyclohexylidene$\Delta^4/\Delta^5$-anhydro-convallatoxol-19-O-methoxyacetate By analogy to Example 9, 941 mg of 2',3'-O-cyclohexylidene-convallatoxol are reacted with 3 ml of trimethyl orthomethoxyacetate in 25 ml of dioxane. Processing as usual and crystallization from ether yields 282 mg of TLC-homogeneous product. M.p. 211°–223°C.
IR (KBr) inter alia 1775/1742, 1620, 1192, 1125 cm$^{-1}$.

Analysis for $C_{38}H_{56}O_{11}$. Calc.: C — 66.26; H — 8.19; O — 25.55. Found: C — 66.55; H — 7.99; O — 25.53.

EXAMPLE 14

2',3'-O-sec-Butylidene$\Delta^4/\Delta^5$-anhydro convallatoxol-19-O-propionate

By analogy to the process described in Example 9, 427 mg of 2',3'-O-sec-butylideneconvallatoxol are reacted with 1.5 ml of triethyl orthopropionate in 15 ml of dioxane. 350 mg of TLC-homogeneous product are obtained as white foam which can be crystallized from ether. M.p. 178°–179°C and 186°–187°C.
IR (KBr) inter alia 1779/1743, 1620, 1190, 1077 cm$^{-1}$.

Analysis for $C_{36}H_{52}O_{10}$. Calc.: C — 67.06; H — 8.13; O — 24.81. Found: C — 66.76; H — 8.19; O — 25.07.

EXAMPLE 15

$\Delta^4/\Delta^5$-Anhydro-cymarol-19-chloroacetate

By analogy to Example 1, 550 mg of cymarol are reacted with trimethyl orthochloroacetate. After chromatography on silica gel there are obtained 430 mg of raw material which is precipitated from benzene with hexane. M.p. 90°–100°C.
IR (KBr) inter alia 1775/1740, 1620, 1190, 1085, 1000 cm$^{-1}$.

Analysis for $C_{32}H_{45}ClO_9$. Calc.: C — 63.09; H — 7.45; Cl — 5.82; O — 23.63. Found: C — 62.76; H — 7.45; Cl — 5.92; O — 23.88.

EXAMPLE 16

$\Delta^4/\Delta^5$-Anhydro-cymarol-19-valerate

By analogy to Example 1, cymarol is reacted with triethyl orthovalerate. Anhydro-cymarol-19-valerate is obtained as an amorphous powder. M.p. 80°–82°C.
IR (KBr) inter alia 1780/1730, 1620, 1190, 1165, 1085, 1000 cm$^{-1}$.

Analysis for $C_{35}H_{52}O_9 \cdot 1/4 H_2O$. Calc.: C — 67.66; H — 8.52; O — 23.82. Found: C — 67.74; H — 8.32; O — 24.06.

EXAMPLE 17

$\Delta^4/\Delta^5$-Anhydro-cymarol-19$\beta$-methoxy-propionate

By analogy to Example 1, 550 mg of cymarol are reacted with trimethyl-$\beta$-methoxy-orthopropionate to obtain anhydro-cymarol-19$\beta$-methoxy-propionate which may be recrystallized from acetone/diisopropyl ether/hexane as the etherate having a m.p. of 93°–95°C.
IR (KBr) inter alia 1780/1735, 1620, 1195, 1165, 1088, 1005 cm$^{-1}$.

Analysis for $C_{34}H_{50}O_{10} \cdot /C_6H_{14}O$. Calc.: C — 66.65; H — 8.95; O — 24.40. Found: C — 66.76; H — 8.89; O — 24.47.

EXAMPLE 18

3'-O-Methoxyacetyl-$\Delta^4/\Delta^5$-anhydro-helveticosol-19-methoxyacetate 550 mg of helveticosol are dissolved in 10 ml of dioxane and reacted with 1 ml trimethyl orthomethoxyacetate and 50 mg p-toluenesulphonic acid monohydrate. The reaction mixture is stirred for one hour at room temperature, neutralized with an aqueous solution of sodium bicarbonate and subsequently extracted with chloroform. After drying and evaporating the solvent in a vacuum an oily residue is obtained which is mixed with 10 ml methanol and 10 ml 10% aqueous acetic acid. The reaction mixture is stirred for one hour at ambient temperature and subsequently treated as described above. After chromatography of the residue on silica gel and thoroughly mixing with hexane 398 mg of an amorphous product are obtained which sinters at about 85°C.
IR (KBr) inter alia 1780/1740, 1620, 1190, 1125, 1023 cm$^{-1}$.

Analysis for $C_{35}H_{50}O_{12}$. Calc.: C — 63.43; H — 7.60; O — 28.97. Found: C — 63.64; H — 7.74; O — 28.62.

EXAMPLE 19

$\Delta^4/\Delta^5$-Anhydro-helveticosol-19-butyrate 555 mg of 3'4'-O-diacetyl-helveticosol are reacted with trimethyl orthobutyrate in an analogous manner as described in Example 8. The 3'4'-O-diacetyl-anhydro-helveticosol-19-butyrate which is obtained in a practically quantitative yield is allowed to stand for 18 hours at 0°C in a solution of 100 ml methanol saturated with ammonia. After evaporation in a vacuum and after purification by chromatography on silica gel there are obtained 491 mg of $\Delta^4/\Delta^5$-anhydro-helveticosol-19-butyrate as a colorless foam having a sintering point of about 85°C.

IR (KBr) inter alia 1780/1735, 1620, 1205, 1170, 1075, 1010 cm$^{-1}$.

Analysis for $C_{33}H_{48}O_9 \cdot 1/2 H_2O$. Calc.: C — 66.31; H — 8.26; O — 25.42. Found: C — 66.26; H — 8.07; O — 25.15.

EXAMPLE 20

$\Delta^4/\Delta^5$-Anhydro-helveticosol-19-propionate 555 mg of 3',4'-O-diacetyl-helveticosol are reacted with trimethyl orthopropionate in an analogous manner as described in Example 8. The obtained 3',4'-O-diacetyl-anhydro-helveticosol-19-propionate is deacetylated with methanolic ammonia as described in Example 19. After purification by chromatography on silica gel there are obtained 48 mg of $\Delta^4/\Delta^5$-anhydro-helveticosol-19-propionate as an amorphous product having a sintering point of 107°C.

IR (KBr) inter alia 1780/1735, 1620, 1190, 1165, 1073, 1010 cm$^{-1}$.

Analysis for $C_{33}H_{46}O_9 \cdot H_2O$. Calc.: C — 64.85; H — 8.16; O — 26.99. Found: C — 64.62; H — 8.18; O — 27.40.

EXAMPLE 21

3'-O-Acetyl-$\Delta^4/\Delta^5$-anhydro-helveticosol-19-propionate 835 mg of anhydro-helveticosol-19-propionate manufactured according to Example 20 are dissolved in 5 ml dioxane and 5 ml triethyl orthoacetate and 80 mg p-toluenesulfonic acid monohydrate are added. After stirring for 30 minutes at ambient temperature the mixture is neutralized with bicarbonate solution and extracted with chloroform. To the oily extraction residue which was obtained in the usual manner a mixture of methanol and 10% aqueous acetic acid (1:1) is added and the mixture is subsequently stirred for one hour at ambient temperature. After working up in the usual manner and after chromatographic purification 698 mg of 3'-O-acetyl-$\Delta^4/\Delta^5$-anhydro-helveticosol-19-propionate are obtained as an amorphous product having a sintering point of about 110°C.

IR (KBr) inter alia 1780/1730, 1620, 1245, 1200, 1165, 1080, 1015 cm$^{-1}$.

Analysis for $C_{34}H_{48}O_{10}$. Calc.: C — 66.21; H — 7.84; O — 25.94. Found: C — 66.07; H — 7.83; O — 25.81.

EXAMPLE 22

3'-O-Propionyl-$\Delta^4/\Delta^5$-anhydro-helveticosol-19-propionate 550 mg of a anhydro-helveticosol-19-propionate are reacted with triethyl-orthopropionate as described in Example 21. After chromatographic purification on silica gel 358 mg of 3'-O-propionyl-$\Delta^4/\Delta^5$-anhydro-helveticosol-19-propionate are obtained as an amorphous powder having a sintering point of 100°–106°C.

IR (KBr) inter alia 1780/1730, 1620, 1190, 1165, 1080, 1020 cm$^{-1}$.

Analysis for $C_{35}H_{50}O_{10} \cdot 1/2 H_2O$. Calc.: C — 65.71; H — 8.03; O — 26.26. Found: C — 65.96; H — 7.81; O — 26.33.

EXAMPLE 23

2',3'-O-sec-Butylidene-$\Delta^4/\Delta^5$-anhydro-convallatoxol-19-methoxyacetate 855 mg of 2'3'-O-sec-butylidene-convallatoxol are reacted with trimethyl orthomethoxyacetate as described in Example 9. After the usual work up and chromatographic purification on silica gel 670 mg of 2',3'-O-sec-butylidene-$\Delta^4/\Delta^5$-anhydro-convallatoxol-19-methoxyacetate are obtained as a colorless foam which is crystallized from pyridine/ether/hexane. M.p. 193°–195°C.

IR (KBr) inter alia 1780/1740, 1620, 1193, 1130, 1078, 1000 cm$^{-1}$.

Analysis for $C_{36}H_{52}O_{11}$. Calc.: C — 65.44; 1H — 7.93; O — 26.64. Found: C — 65.88; H — 7.72; O — 26.24.

We claim:
1. A compound of formula I:

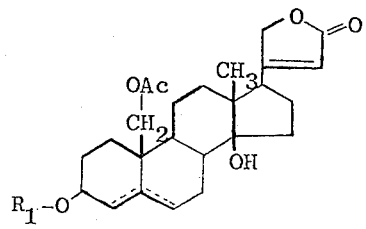

wherein $R_1$ represents a member of the group consisting of a rhamnose-cymarose- or digitoxose radical which may be substituted by methyl, lower alkylidene, cyclohexylidene, lower alkanoyl and lower alkoxyalkanoyl and Ac represents a member of the group consisting of an unsubstituted alkanoyl radical of 3 to 5 carbon atoms and an alkanoyl radical of 2 to 3 carbon atoms substituted by chloro or methoxy radicals.

2. $\Delta^4/\Delta^5$-Anhydro-cymarol-19-O-propionate.
3. $\Delta^4/\Delta^5$-Anhydro-cymarol-19-O-methtoxyacetate.
4. 4'-O-Methoxyacetyl-$\Delta^4/\Delta^5$-anhydro-cymarol-19-O-propionate.
5. 4'-O-Methyl-$\Delta^4/\Delta^5$-anhydro-helveticosol-19-O-propionate.
6. $\Delta^4/\Delta^5$-Anhydro-cymarol-19-O-butyrate.
7. 3',4'-O-Cyclohexylidene-$\Delta^4/\Delta^5$-anhydro-helveticosol-19-O-methoxyacetate.
8. 3',4'-O-Cyclohexylidene-$\Delta^4/\Delta^5$-anhydro-helveticosol-19-O-propionate.
9. $\Delta^4/\Delta^5$-Anhydro-helveticosol-19-O-methoxyacetate.
10. 2',3'-O-Isopropylidene-$\Delta^4/\Delta^5$-anhydro-convallatoxol-19-O-propionate.
11. 2',3'-O-Isopropylidene-$\Delta^4/\Delta^5$-anhydro-convallatoxol-19-O-methoxyacetate.
12. $\Delta^4/\Delta^5$-Anhydro-convallatoxol-19-O-methoxyacetate.
13. 2',3'-O-Isopropylidene-$\Delta^4/\Delta^5$-anhydro-convallatoxol-19-O-butyrate.
14. 2',3'-O-Cyclohexylidene-$\Delta^4/\Delta^5$-anhydro-convallatoxol-19-O-methoxyacetate.
15. 2',3'-O-sec Butylidene-$\Delta^4/\Delta^5$-anhydro-convallatoxol 19-O-propionate.
16. $\Delta^4/\Delta^5$-Anhydro-cymarol-19-chloroacetate.
17. $\Delta^4/\Delta^5$-Anhydro-cymarol-19-valerate.

18. $\Delta^4/\Delta^5$-Anhydro-cymarol-19β-methoxypropionate.
19. 3'-O-Methoxyacetyl-$\Delta^4/\Delta^5$-anhydro-helveticosol-19-methoxyacetate.
20. $\Delta^4/\Delta^5$-Anhydro-helveticosol-19-butyrate.
21. $\Delta^4/\Delta^5$-Anhydro-helveticosol-19-propionate.
22. 3'-O-Acetyl-$\Delta^4/\Delta^5$-anhydro-helveticosol-19-propionate.
23. 3'-O-Propionyl-$\Delta^4/\Delta^5$-anhydro-helveticosol-19-propionate.
24. 2',3'-O-sec-Butylidene-$\Delta^4/\Delta^5$-anhydro-convallatoxol-19-methoxyacetate.

\* \* \* \* \*